UNITED STATES PATENT OFFICE.

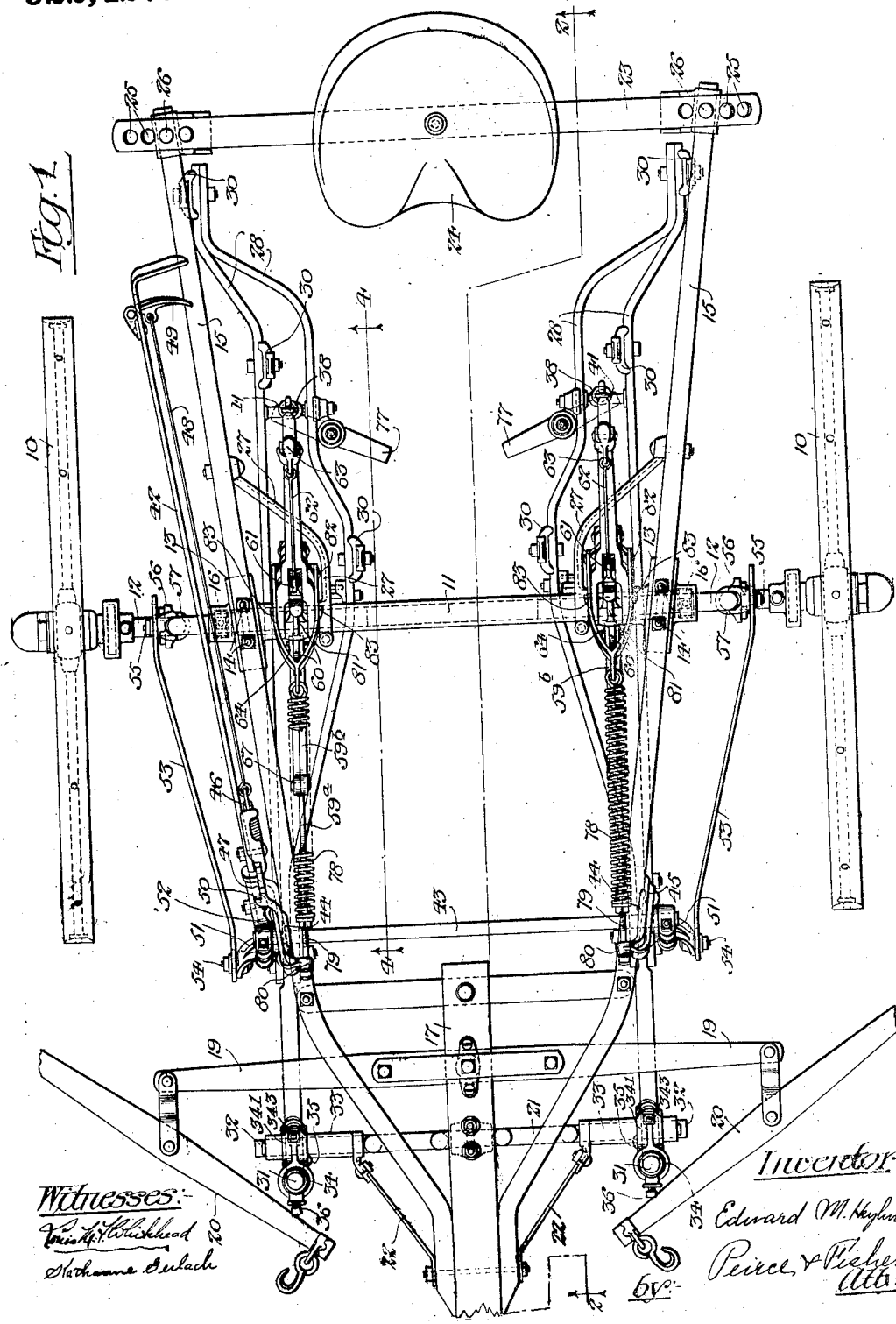

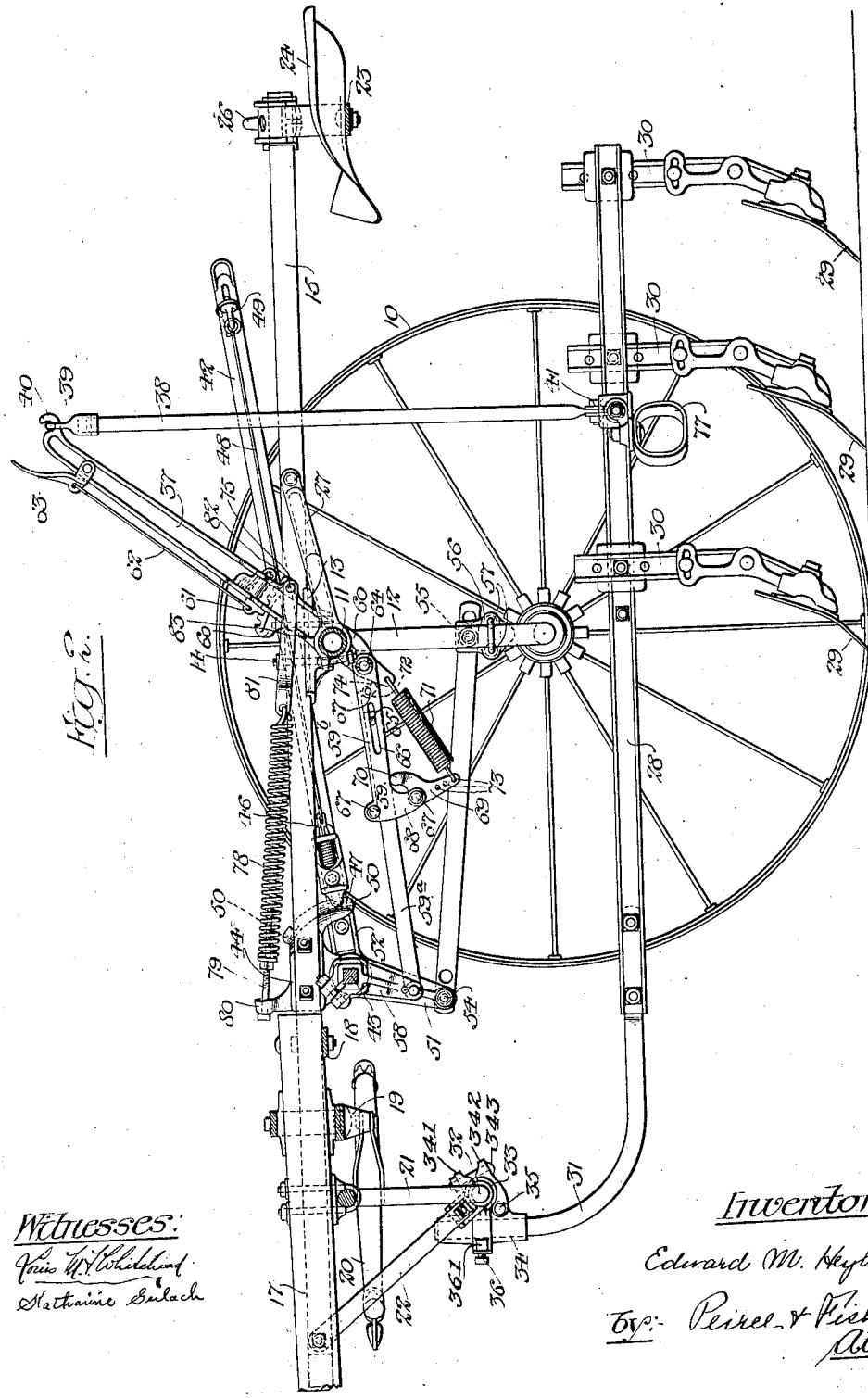

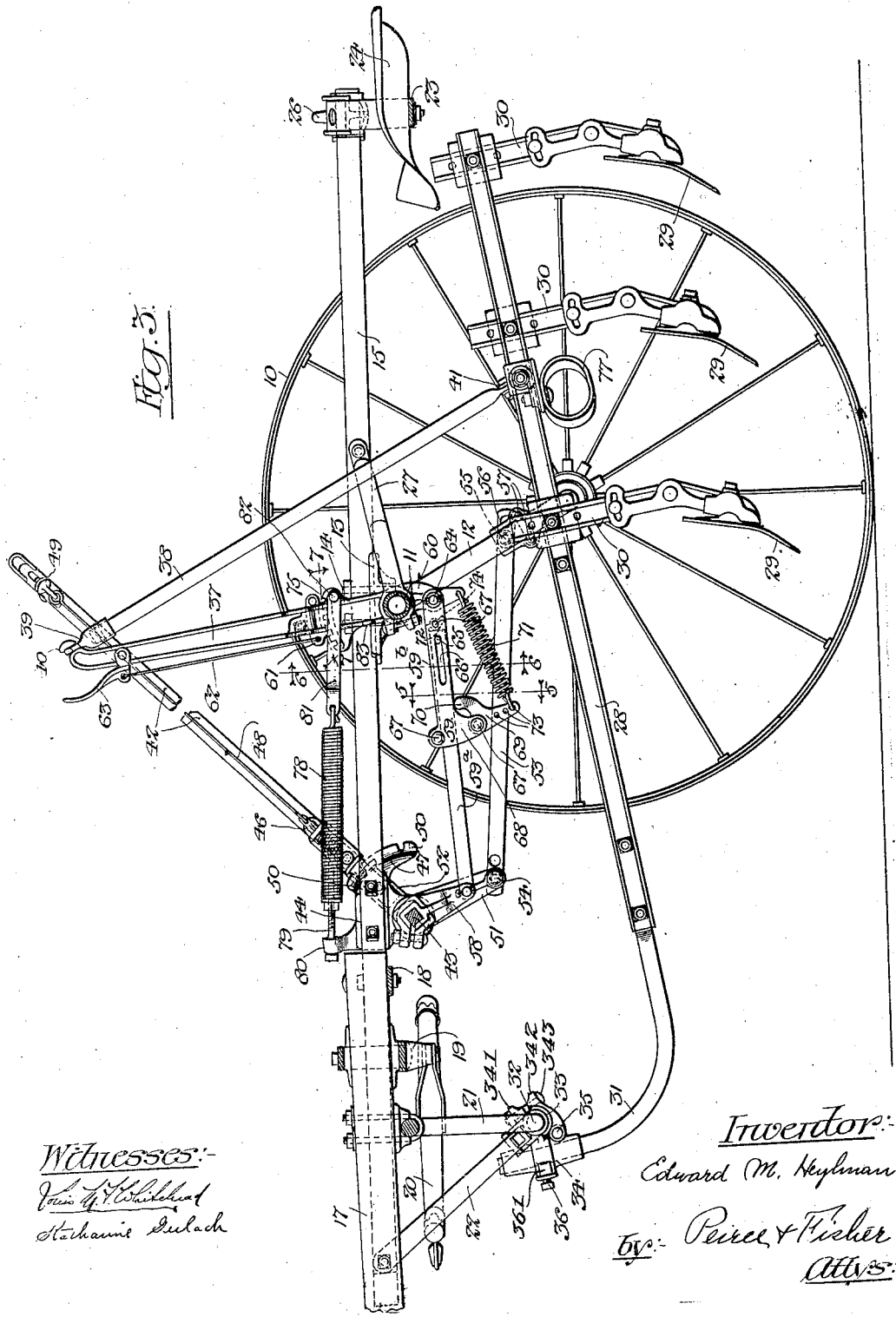

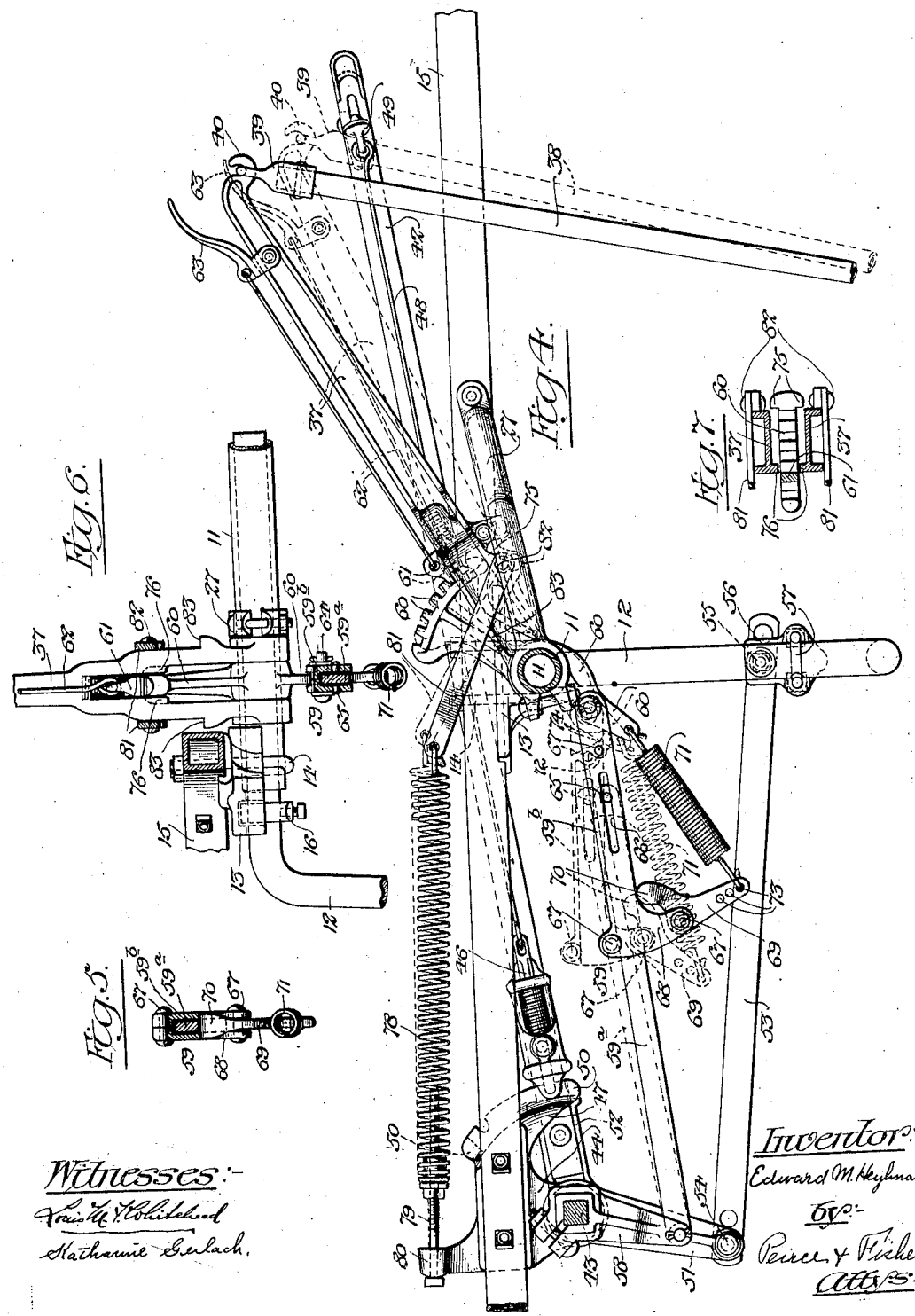

EDWARD M. HEYLMAN, OF JANESVILLE, WISCONSIN, ASSIGNOR TO THE JANESVILLE MACHINE COMPANY, OF JANESVILLE, WISCONSIN, A CORPORATION.

CULTIVATOR.

No. 922,427.    Specification of Letters Patent.    Patented May 18, 1909.

Application filed November 15, 1907. Serial No. 402,237.

*To all whom it may concern:*

Be it known that I, EDWARD M. HEYLMAN, a citizen of the United States, and a resident of Janesville, county of Rock, and State of Wisconsin, have invented certain new and useful Improvements in Cultivators, of which the following is a specification.

The invention relates to wheel cultivators, and seeks to provide a simple and effective shift mechanism for moving the frame relatively to the wheels and at the same time raising and lowering the shovel beams, so that the rider's weight will properly balance the machine both when the shovel beams are raised and when they are in working position, and so that the forward pull of the team may be utilized for raising the shovel beams.

Further objects of the invention are to provide simple and effective means for yieldingly holding the shovel beams in working position and for effecting the adjustment and raising and lowering of the shovel beams independently of the shift mechanism.

The invention also seeks to provide an improved form of lift spring for assisting in shifting the frame and raising the shovel beams, together with means for compensating for the decrease in leverage of the spring as the shovel beams approach their working position.

The invention consists in the combinations and arrangements of parts hereinafter set forth, illustrated in the accompanying drawings and more particularly pointed out in the appended claims.

Figure 1 is a plan view of the improved cultivator. Fig. 2 is a longitudinal section thereof with the shovel beams in working position. Fig. 3 is a view similar to Fig. 2 with the shovel beams in raised position. Fig. 4 is an enlarged detail section on lines 4—4 of Fig. 1 showing the parts of the shift mechanism. Fig. 5 is an enlarged detail section on lines 5—5 of Fig. 3. Fig. 6 is an enlarged detail section on lines 6—6 of Fig. 3, and Fig. 7 is a section taken on line 7—7 of Fig. 3.

The cultivator is of the wheeled, "straddle-row" type. The supporting wheels 10 are mounted upon spindles at the lower ends of the arched axle. This axle (see Fig. 1) preferably comprises a central tubular section 11 and depending wheel sections 12. The central tubular section 11 is preferably secured by brackets 13 and U-bolts 14 to the side bars 15 of the frame (see Fig. 6) so that in effect the central tubular section 11 of the wheel axle forms part of the frame and serves as a cross-connecting bar between the side-bars 15 of the frame. The depending wheel sections 12 are provided with upper horizontal portions which extend within the tubular section 11 and clamp-collars 16 thereon engage recesses in the bracket 13, so that the depending wheel sections of the axle are pivotally connected to the frame and may also be adjusted laterally within the tubular section 11 to adapt the machine for different widths of rows.

The forward converging ends of the side bars 15 of the frame are secured to the pole 17. A transverse brace-bar 18 extends between the forward ends of the side-bars and is connected to the rear end of the pole. A doubletree 19 pivoted to the pole is provided at its ends with swingletrees 20. A supporting arch 21 for the forward ends of the shovel beams is secured to the pole 17 and is connected thereto by the inclined brace-bars 22. From the arched axle, the side-bars 15 extend rearwardly and support the transverse seat-bar 23. This bar is provided with the rider's seat 24 and with a series of holes 25 in each end for adjustably engaging pins 26 on the rear ends of the side-bars 15. Inclined brace-bars 27 are secured to the side-bars 15 of the frame and extend forwardly and inwardly therefrom and embrace the central tubular section of the arched axle.

The shovel beams or gangs may be of any usual or suitable construction. In the form shown, they are constructed of separate sections 28 bolted together in offset relation to carry the shovels 29 on the shanks 30 in proper position. At their forward ends, the sections 28 of the shovel beams are secured to upright standards 31 that are connected by suitable couplings to the spindles 32 of the arched bar 31. These couplings comprise horizontal sleeves 33 rotatably mounted on the spindles 32 and vertical sleeves 34 adjustably clamped to the horizontal sleeves 33. The clamp for adjustably securing the sleeves 34 upon the rotatable horizontal sleeves 33, comprises an upper member 341 formed in piece with the sleeves 34 and a lower member 342 connected to the sleeves 34 by a bolt 35. The clamp members 341 and 342 are suitably shaped to engage the sleeve 33 and are held in place thereon by a bolt 343 that extends through the ends of the clamp members. The standards 31 of the shovel beams or gangs extend within and are swiveled to the sleeves 34. They are secured in place therein by a clamp ring 361 which fits within the enlarged central portion of the sleeves 34 and a clamp bolt 36. The clamp bolt 36 extends outwardly through a slot in the sleeves 34 so that the standards 31 may move within the sleeves to permit the lateral movement of the shovel beams or gangs. The rotation of the horizontal sleeves 33 upon the spindles 32 permits the vertical movement of the gangs or shovel beams to and from working position. By loosening the nuts on the bolts 343 the couplings may be shifted laterally upon the sleeves to hold the shovel beams or gangs at different distances apart.

The rear ends of the shovel beams are upheld by a pair of pivoted supporting arms 37 that are connected to the beams by the suspension rods or links 38. Each rod 38 is provided at its upper end with an eye 39 engaging a hook 40 on the upper end of the companion supporting arm 37 and, at its lower end, rod 38 is secured to its shovel beam by a suitable coupling 41. The supporting arms 37 are preferably pivoted or journaled directly upon the horizontal, tubular section 11 of the arched axle and are held in place on the ends thereof between the brackets 13 and the brace-bars 27.

A balancing shift mechanism is provided for moving the frame relatively to the wheels and at the same time raising and lowering the shovel beams. This mechanism is controlled by a balancing shift lever 42 that is connected by a rock-shaft and a number of links to the depending wheel sections 12 of the arched axle and to the supporting arms 37 of the shovel beams to raise and lower the latter and at the same time shift the frame relatively to the supporting wheels 10. The transverse rock-shaft 43 of the shift mechanism is arranged preferably at the front of the machine just below the side-bars 15 and is journaled at its ends in brackets 44 and 45 that are fixed respectively to the side-bars 15. The balancing shift lever 42 is secured to the right-hand end of the rock-shaft 43 outside of the bracket 44 and extends rearwardly within easy reach of the rider's seat. A spring-held dog 46 on the forward end of the shift-lever 42 is arranged to engage one of a pair of notches in a sector 47 that is formed on the bracket 44 to hold the shift lever in its raised or lowered positions. Dog 46 is connected as usual by a rod 48 to an operating hand piece 49 pivoted at the free end of the lever. The sector 47 is also provided at its ends with stops 50 for positively limiting the throw of the balancing shift-lever 42. A pair of rock-arms 51 are fixed to the ends of the shaft 43 outside of the brackets 44 and 45 and extend downwardly therefrom. The right-hand arm 51 is preferably formed in piece with a casting 52 which is clamped to the rock-shaft 43 and which forms the forward end of the shift-lever 42. The arms 51 are connected by links 53 to the depending wheel sections 12 of the arched axle. These links are connected at their forward ends to the rock-arm 51 by pivot bolts 54 and at their rear ends by pivot bolts 55 to brackets 56 which are secured to the lower ends of the depending wheel sections 12 by U-bolts 57. The opposite ends of these links are preferably provided with two or more holes for the pivot bolts 54 and 55 so that the links may be adjustably connected to the arms 51 and to the wheel sections 12 of the arched axle. By the shift mechanism described, the frame of the machine is shifted relatively to the supporting wheels as shown in Figs. 2 and 3 to properly balance the machine both in the working and riding positions of the shovel beams.

The rock-shaft 43 is also provided with a pair of arms 58 which are clamped to the shaft just inside the brackets 44 and 45 and which extend downwardly therefrom. These arms are connected by links 59 to the supporting arms 37 for the shovel beams so that the latter are raised and lowered by the balancing shift mechanism. To permit the adjustment of the shovel beams independently of the shift mechanism, the links 59 are connected thereto through the medium of a pair of pivoted sector arms 60. These sector arms, like the supporting arms 37, are preferably journaled or pivoted upon the horizontal, tubular section 11 of the arched axle. Each supporting arm 37 is forked at its lower end to embrace the corresponding sector arm as clearly shown in Fig. 6 and is provided with a spring-pressed dog 61 which engages one of a series of notches in the upper end of the sector arm to adjustably connect the supporting arm thereto. Dog 61 is connected as usual by a rod 62 to an operating finger-piece 63 pivoted at the upper end of the supporting arm or lever 37.

A portion of each sector arm 60 extends below the central section 11 of the axle and is connected to the corresponding link 59 by a pivot pin or bolt 64. Each link 59 is formed of two, slidably and pivotally connected sections 59$^a$ and 59$^b$. The rear section 59$^b$ that is connected to the sector arms 60 is preferably in the form of a sleeve within which the forward link section 59$^a$ slides. A cross-pin 65 in the rear end of the link section 59$^a$ engages longitudinally extending slots 66 in the link section 59$^b$, so that the link section 59$^a$ slides or telescopes within the sleeve or link section 59$^b$. The latter, however, is open on its under side or is of inverted U-shape in section, so that the two parts of the links may be deflected or moved out of line as hereinafter described. The connection between the link sections 59ᵃ and 59ᵇ is what may be termed a slidable, articulating, pin-and-slot or lost motion connection. By reason of this lost motion connection the lever 42, as it is moved from the position shown in Fig. 2 to that shown in Fig. 3 to shift the frame and raise the shovel beams, will first move the upper horizontal section of the arched axle in front of the spindles of the supporting wheels and will not begin to lift the shovel beams until the rear ends of the link sections 59ᵃ reach abutments or walls 72 at the rear ends of the link sections 59ᵇ. At this point, inasmuch as the fulcrum of the frame has been thrown in front of the wheel spindles, the rider's weight and the draft of the team will be exerted to automatically lift the shovel beams.

The link section or sleeve 59ᵇ is formed of two parts connected by rivets 67. One of these rivets extends through the lower end of a projection 68 depending from the forward end of the link section 59ᵇ and forms a pivot for an L-shaped dog 69. The upper arm of this dog is provided with a head 70 (see Fig. 5) which is of sufficient width to engage the lower edges of the link sections 59ᵃ and 59ᵇ. The dog 69 is arranged between the parts of the link section 59ᵇ. The sector arm 60 is secured between the parts of the link section 59ᵇ by the pivot pin 64 and extend slightly below the frame as shown. A coiled spring is connected at one end to the lower end of the sector arm 60 and its other end adjustably engages one of the series of holes 73 in the lower arm of the dog 69. A stop lug 74 is formed between the parts of the link section 59ᵇ and engages the portion of the sector arm 60 below the pivot pin 64 to limit the backward or lowering movement of the sector arm and of the supporting arm 37 for the shovel beam. This stop device thus serves to limit the lowering movement of the supporting arm for the shovel beam so that the latter is upheld in its normal working position. The supporting arm 37, however, may be adjusted relatively to the sector arm 60 and stop device 74 to vary the normal working position of the shovel beam by tripping the dog 61 and adjusting the supporting arm 37 as desired. The dog 61 will then be reengaged with one of the notches of the sector arm to hold the supporting arm 37 in adjusted position. The sector arm is provided with laterally projecting stop-lugs 75 (see Fig. 7) which are arranged to engage projecting flanges 76 on the front inner end of the supporting arm 37 to positively limit the backward movement of the latter relatively to the sector arm.

One of the functions of the spring 71 is to hold the sector arm 60 and link section 59ᵇ in position with the lower end of the sector arm against the stop lug 74 when the supporting arm 37 is disengaged from the sector arm by tripping the dog 61. Were it not for this spring the sector arm would be free to move about when the supporting arm 37 was disengaged therefrom. Another function of the spring 71 is to hold the link sections 59ᵃ and 59ᵇ yieldingly in line, but permitting the deflection or articulation of the same so that the shovel beams may be depressed below their working position without disturbing the adjustment, either of the balancing shift lever 42 or of the supporting arms or levers 37. For this purpose, the shovel beams are provided with stirrups or foot-pieces 77 by which the rider may properly guide the shovel beams in lateral direction. He may also depress the shovel beams to properly cultivate a low place in the ground. This depression will shift the supporting arm 37 from the position shown in full lines in Fig. 4 to that shown in dotted lines and will also cause a deflection or articulation of the pivotally connected link sections 59ᵃ and 59ᵇ as indicated in dotted lines in Fig. 4. The deflection of the link sections will stretch the spring 71 through the medium of the dog 69 and, when the pressure of the rider's feet upon the shovel beams is released, the spring 71 and dog 69 will restore the link sections and other parts to normal working position.

By connecting the spring 71 both to the dog 69 and to the lower end of the sector arm 60 it not only serves to yieldingly hold the shovel beams in working position but also, as above stated, serves to hold the sector arm in position when the supporting arm 37 is disengaged therefrom. If otherwise arranged, two springs would be necessary to perform these two separate functions An improved arrangement of lift spring is provided for aiding the operator and the team in balancing the machine and in raising and lowering the shovel beams. In cultivators of this type it is usual to connect the lift springs to the upper ends of the supporting arms 37. But the movement of the upper ends of the supporting arms, and the necessary stretch of the springs when so connected, are so great that only light springs may be employed. Heavy lift springs may be connected to the lower ends of the supporting arms adjacent their pivots but, when so arranged, the springs approach a dead center position when the cultivator beams are lowered. This decrease in leverage of the springs becomes greater as the supporting arms 37 are adjusted, as shown in Fig. 4, to hold the cultivator beams at a low level and interferes with the proper action of the springs in starting the shovel beams from working position.

In accordance with the present invention, heavy lift springs 78 are employed and are connected at their forward ends by adjusting screws 79 to lugs 80 on the brackets 44 and 45. At their rear ends, the springs are connected by links 81 to the lower ends of the supporting arms 37 adjacent their pivots. These links are in the form of U-shaped stirrups which embrace the lower ends of the arms 37 and are connected thereto by pivot bolts 82. The arms 37 are provided with projections or lugs 83 which are arranged to engage the links 81 and elevate the rear ends of the spring 78 as the shovel beams approach their working position (see Fig. 4). This compensating device is particularly effective when the supporting arms are adjusted as shown in Fig. 4 to hold the shovel beams at a low working position. The pivot 82 for the link 81 and the lugs 83 for lifting the link and the rear end of the spring are relatively so arranged as to increase the leverage of the spring 78 to practically the same extent as such leverage is decreased by the movement of the arm 37 toward a horizontal position so that the pull of the spring is effective for starting the beams and shovels from the ground and is substantially the same whatever may be the adjustment of the supporting arms 37 and shovel beams upheld thereby. This arrangement also permits of the use of a heavy lift spring in a self-balancing cultivator of the type described; that is, one in which the frame is shifted to balance the machine at the same time that the shovel beams are raised and lowered.

The invention provides an efficient cultivator having a balancing shift mechanism, which is controlled by a single lever, and by which the weight of the machine is properly balanced as the shovel beams are raised and lowered and by which the rider's weight and the draft of the team are utilized in raising the shovel beams from working position. At the same time, the working level of the shovel beams may be adjusted independently of the balancing shift mechanism and the beams are yieldingly supported in working position so that they may be depressed to cultivate a low portion of ground, without disturbing the adjustment of the balancing lever or of the adjusting levers. The improved arrangement of the lift spring permits of the use of a heavy spring and provides means for holding the springs away from a dead center position so that it is effective in all adjustments of the shovel beams. While the stop-lugs 74 and 75 limit the backward movement of the supporting arms or levers 37 relatively to the sector arms 60, these arms or levers may be moved to their extreme forward position independently of the sector arms. So that, when the balancing shift lever is in its lower position, shown in Fig. 2, the arms or levers 37 may be used to raise and lower the shovel beams independently of the balancing shift mechanism and independently of each other.

In the raised position of the shovel beams, suspension rods or links 38 engage the inclined brace-bars 27 and are forced inwardly thereby to hold the shovel beams away from the wheels.

By utilizing the central portion of the arched axle as a support for the pivoted supporting arms 37 and sector arms 60, the cost of manufacture is materially reduced and the supporting arms or levers and the suspension rods 38 are brought well toward the rear of the machine where they may be readily manipulated by the operator in the seat 24.

It is obvious that numerous changes could be made in the details set forth without departure from the essentials of the invention.

Having described my invention, what I claim as new and desire to secure by Letters Patent, is:—

1. In cultivators, the combination with the frame and shovel beams hung therefrom, of an arched wheel axle pivoted to the frame, supporting arms for the shovel beams journaled directly on the upper horizontal portion of said axle, a balancing shift lever connected to said wheel axle and independent connections between said shift lever and said supporting arms, said arms being adjustable independently of said shift lever and of said connections to vary the height of said shovel beams substantially as described.

2. In cultivators, the combination with the frame and shovel beams hung therefrom, the wheel axle comprising a tubular horizontal section secured to the side-bars of the machine frame and depending wheel sections journaled in said horizontal section, supporting arms loosely journaled on the horizontal section of the arched axle, links connecting said arms and said shovel beams, a balancing shift lever connected to the depending portions of the wheel axle, and connections between said shift lever and said supporting arms said arms being adjustable independently of said shift lever and of said connections to vary the height of the shovel beams, substantially as described.

3. In cultivators, the combination with the frame and shovel beams carried thereby, of an arched wheel axle journaled on the frame, notched sector arms journaled directly on the horizontal portion of said wheel axle, supporting arms adjustably connected to said sector arms, links connecting said arms to said shovel beams, and a balancing shift lever connected to said wheel axle and said sector arms, substantially as described.

4. In cultivators, the combination with the machine frame and shovel beams carried thereby, of an arched axle comprising a central horizontal section secured to the side bars of the machine frame and depending wheel sections journaled in said horizontal section, notched sector arms journaled directly on the horizontal section of the wheel axle, supporting arms adjustably engaging said sector arms, links connecting said arms with said shovel beams and a balancing shift lever and rock shaft having arms connected to the depending sections of the wheel axle and to said notched segments, substantially as described.

5. In cultivators, the combination with the machine frame and shovel beams carried thereby, of an arched wheel axle comprising a central tubular section secured to the side bars of the machine frame and depending wheel sections journaled in said horizontal section, notched sector arms journaled directly on said horizontal section, supporting arms also directly journaled thereon and having dogs adjustably engaging said sector arms, links connecting said arms and said shovel beams, and a balancing shift lever having connections with said wheel sections and said segments, substantially as described.

6. In cultivators, the combination with the machine frame and shovel beams carried thereby, of an arched wheel axle comprising a horizontal, tubular section secured to the side bars of the machine frame and depending wheel sections journaled in said horizontal section, supporting arms journaled directly upon said tubular horizontal section, notched sector arms also directly journaled thereon, said arms having dogs for adjustably engaging said sector arms, links extending downwardly behind said wheel axle and connecting said arms and said shovel beams, a rock-shaft journaled at the front of the machine frame, a pair of arms on said rock shaft connected to said depending wheel sections and a pair of arms on said rock-shaft connected to said sector arms, substantially as described.

7. In cultivators, the combination of the machine frame and the shovel beams carried thereby, of an arched wheel axle comprising a central, tubular section secured to the side bars of the machine frame and depending wheel sections journaled in said horizontal section, inclined brace bars connecting the side bars of the machine frame and said horizontal section, supporting arms journaled on said horizontal section between the side bars and said brace bars, links connecting said supporting arms and said shovel beams and arranged to engage said inclined brace bars to the raised position of the shovel beams, and a balancing shift lever connected to said depending wheel sections and said supporting arms, substantially as described.

8. In cultivators, the combination with the machine frame and shovel beams carried thereby, of an arched wheel axle pivoted to the machine frame, a pair of independently mounted notched sector arms, a pair of supporting arms having dogs for adjustably engaging said sector arms, links connecting said arms and said shovel beams, a rock-shaft journaled at the front of the machine frame, a pair of rock arms on said rock-shaft connected by links to said wheel axle, and a pair of arms on said shaft connected by links to said sector arms, substantially as described.

9. In cultivators, the combination with the machine frame and shovel beams carried thereby, of an arched wheel axle comprising a central tubular section secured to the side bars of the machine frame and depending wheel sections journaled and laterally adjustable in said horizontal section, notched sector arms pivotally mounted on the central section of the arched axle, supporting arms also journaled thereon, dogs on said arms for adjustably engaging said notched sector arms, suspension rods connecting said arms with said shovel beams, a rock-shaft journaled at the front of the machine frame, a pair of arms on said rock-shaft connected by links to said depending wheel section, and a pair of arms on said shaft connected by links to said sector arms, substantially as described.

10. In cultivators, the combination with the machine frame and shovel beams carried thereby, of an arched wheel axle pivoted to the frame, notched sector arms journaled on the horizontal portion of the wheel axle and having parts depending below the same, pivoted supporting arms having dogs adjustably engaging said sector arms, suspension rods connecting said arms and said shovel beams, a rock-shaft journaled on the front of the machine frame, depending arms on said rock-shaft connected by links to said wheel axle and depending arms connected by links to the depending portions of said sector arms, substantially as described.

11. In cultivators, the combination with the machine frame and shovel beams hung thereon, swinging supporting arms on the machine frame connected to said shovel beams, lift springs connected to said arms adjacent their pivots and means for compensating for the decrease in leverage of said springs as said shovel beams are lowered to working position, substantially as described.

12. In cultivators, the combination with the machine frame, and shovel beams hung thereon, of suspension arms pivoted on the machine frame and projecting upwardly therefrom, a supporting link connecting said arms and said shovel beams, a lift spring connected at its forward end to the machine frame and at its rear end to said arms adjacent their pivot, and means for raising the rear end of said spring as the shovel beam approaches its working position, substantially as described.

13. In cultivators, the combination with the machine frame and shovel beam hung thereon, of a supporting arm pivoted on the machine frame and projecting upwardly therefrom, a suspension link connecting said arm and said shovel beam, a lift spring connected at its forward end to the machine frame and at its rear end to the said arm adjacent to pivot thereof, and a projection on said arm arranged to lift the rear end of said spring as the shovel beam approaches its working position, substantially as described.

14. In cultivators, the combination with the machine frame, and shovel beam hung thereon, of a supporting arm pivoted to said frame and projecting upwardly therefrom, a suspension link connecting said arm and said beam, a lift spring connected at its forward end to the machine frame, a link pivoted to said arm adjacent its pivot and connected to the rear end of said spring, said arm having a projection arranged to engage said link and raise the rear end of said spring as said shovel beam approaches its working position, substantially as described.

15. In cultivators, the combination with the machine frame and shovel beam hung thereon, of a supporting arm pivoted on the machine frame and projecting upwardly therefrom, a suspension link connecting said arm and said shovel beam, a lift spring connected at its forward end to the machine frame, a double link embracing and pivoted to said arm adjacent its pivot, and lugs on said arm arranged to engage said link and raise the rear end of said spring as said shovel beam approaches its working position, substantially as described.

16. In cultivators, the combination with the machine frame and shovel beam hung thereon, of a pivotally mounted notched sector arm, a pivoted supporting arm having a dog for adjustably connecting it to said sector arm, a connection between said arm and said shovel beam, means for shifting said sector arm to raise and lower the shovel beam, a lift spring connected to said arm adjacent its pivot and means for compensating for the variation in leverage of said spring as said supporting arm is adjusted to hold said shovel beam in different working positions, substantially as described.

17. In cultivators, the combination with the frame and shovel beam hung thereon, of a pivotally mounted sector arm, a pivoted supporting arm connected to the shovel beam and having a dog for engaging said sector arm to hold it in adjusted position, means for shifting said sector arm to raise and lower said shovel beam, a lift spring connected at its forward end to the machine frame and at its rear end to said supporting arm adjacent its pivot and a projection on said supporting arm for raising the rear end of said spring as said shovel beam approaches its working position, substantially as described.

18. In cultivators, the combination with the machine frame and shovel beams hung thereon, of an arched wheel axle pivoted to the frame, a pair of supporting arms connected to said shovel beams, a balancing shift lever connected to the depending portion of said arched wheel axle and to said arms to simultaneously shift the machine frame and raise and lower said shovel beams, said arms being adjustable independently of said shift lever, lift springs connected to said arms adjacent their pivots, and means for compensating for the variation in leverage of said springs as said arms are adjusted to hold said beams in different working positions, substantially as described.

19. In cultivators, the combination with the machine frame and shovel beams hung therefrom, of an arched wheel axle having depending wheel sections pivoted to the frame, a supporting arm pivoted to the frame and projecting upwardly therefrom, a connection between said arm and said shovel beam, a balancing shift lever connected to the depending wheel sections of said arched axle and to said arm to simultaneously shift the frame and raise and lower said shovel beam, a lift spring connected at its forward end to the machine frame and at its rear end to said arm adjacent its pivot, said arm having a projection for raising the rear end of said spring as said shovel beam approaches its working position, substantially as described.

20. In cultivators, the combination with the machine frame and shovel beams hung thereon, of the arched supporting axle having depending wheel sections pivoted to the machine frame, pivotally mounted notched sector arms, pivoted supporting arms connected to the shovel beams and having dogs adjustably engaging said sector arms, a balancing shift lever connected to said depending wheel sections and to said notched sector arms to simultaneously shift the frame and raise and lower said shovel beams, and a pair of lift springs connected at their forward ends to the machine frame and at their rear ends to said supporting arms adjacent their pivots, said arms having projections for raising the rear ends of said springs as said shovel beams approach their working position, substantially as described.

21. In cultivators, the combination with the machine frame and the shovel beam hung thereon, of a supporting arm pivoted on the frame and projecting upwardly therefrom, a connection between said arm and said shovel beam, a lift spring connected at its forward end to the machine frame and at its rear end to said arm adjacent its pivot, and means for holding said lift spring away from a dead center position as said shovel beam approaches its working position, substantially as described.

22. In cultivators, the combination with the frame and shovel beam hung thereon, of a supporting arm pivoted to the frame and connected to said shovel beam, a rock shaft at the forward part of the machine connected to said arm for raising and lowering said shovel beam, and a spring device interposed between said rock shaft and said arm for yieldingly holding said shovel beam in working position but permitting its depression below such position, said arm being adjustable independently of said spring device and said rock shaft to vary the normal working position of said shovel beam, substantially as described.

23. In cultivators, the combination with the frame and shovel beam hung thereon, of a pivotally mounted notched sector arm, a pivoted supporting arm connected to said shovel beam and having a dog adjustably engaging said sector arm, a shift lever connected to said sector arm for raising and lowering said shovel beam and a yielding spring device interposed between said lever and said sector arm for permitting the depression of said shovel beam below its normal working position without disturbing the adjustment of said lever or of said supporting arm, substantially as described.

24. In cultivators, the combination with the frame and shovel beam hung thereon, of an arched axle having depending wheel sections pivoted to the frame, a pivotally mounted notched sector arm, a pivoted supporting arm adjustably engaging said notched sector arm, connections between said supporting arm and said shovel beam, a balancing shift lever connected to said wheel sections and to said sector arm to simultaneously shift the frame and raise and lower said shovel beam, and a yielding spring device interposed between said lever and said sector arm for permitting the depression of said shovel beam below its working position, substantially as described.

25. In cultivators, the combination with the frame and shovel beam hung thereon, a pivoted supporting arm connected to said shovel beam, a shift lever for raising and lowering said shovel beam, a link interposed between said lever and said arm and comprising two pivotally connected sections and a spring device for yieldingly holding said link sections in position, but permitting the deflection thereof whereby the shovel beam may be depressed below its normal working position, substantially as described.

26. In cultivators, the combination with the frame and shovel beam hung thereon, of a pivotally mounted notched sector arm, a pivoted supporting arm having a dog adjustably engaging said notched sector arm, a connection between said supporting arm and said shovel beam, a shift lever for raising and lowering said shovel beam, a link connecting said shift lever and said notched sector arm and comprising two pivotally connected sections, and a spring device for holding said link sections in position but permitting the deflection thereof, whereby the shovel beam may be depressed below its normal working position without disturbing the adjustment of said shift lever or of said supporting arm, substantially as described.

27. In cultivators, the combination with the frame and shovel beam hung thereon, of an arched axle having depending wheel sections pivoted to the frame, a pivoted supporting arm connected to said shovel beam, a balancing shift lever connected to said depending wheel sections and to said supporting arm for simultaneously shifting the frame and raising and lowering said shovel beam, a link interposed between said lever and said arm comprising pivotally connected sections, and a spring device for holding said link sections in position but permitting the deflection thereof, whereby the shovel beam may be depressed below its normal working position independently of said shift lever, substantially as described.

28. In cultivators, the combination with the frame and shovel beam hung thereon, of an arched axle having depending wheel sections pivoted to the frame, a pivotally mounted notched sector arm, a pivoted supporting arm, connected to said shovel beam and having a dog for adjustably engaging said notched sector arm to hold the supporting arm in adjusted position, a balancing shift lever connected to said depending wheel sections and to said sector arm for simultaneously shifting the frame and raising and lowering said shovel beam, the connection between said lever and said sector arm comprising pivotally connected link sections, and a spring device for holding said sections in position, but permitting the deflection of the same, whereby said shovel beam may be depressed below its normal working position without disturbing the adjustment of said shift lever or of said supporting arm, substantially as described.

29. In cultivators, the combination with the frame and with the shovel beams hung thereon, of an arched axle having depending wheel sections pivoted to the frame pivotally mounted sector arms, pivotally mounted supporting arms adjustably connected to said sector arms, connections between said supporting arms and said shovel beams, a rock-shaft journaled at the front of the machine frame, a balancing shift lever connected to said rock-shaft, a pair of arms on said shaft, links connecting said arms on said depending wheel sections, a second pair of arms on said shaft, links connecting said arms and said sector arms and comprising pivotally connected sections, and spring devices for holding said link sections in position but permitting the deflection of the same, whereby said shovel beams may be depressed below their normal working position without disturbing the adjustment of said shift lever or of said supporting arms, substantially as described.

30. In cultivators, the combination with the frame and shovel beam hung thereon, of a supporting arm pivoted on the frame and connected to said shovel beam, a shift lever for raising and lowering said shovel beam, a link between said lever and said supporting arm comprising pivotally and slidably connected sections, a spring device for holding said sections in position but permitting the deflection of the same, whereby said shovel beam may be depressed below its working position without disturbing the adjustment of said shift lever, substantially as described.

31. In cultivators, the combination with the frame and shovel beam hung thereon, of an arched wheel axle having depending wheel sections pivoted to the frame, a pivoted supporting arm on the frame connected to said shovel beam, a balancing shift lever, links connecting said shift lever and said wheel sections and a link connecting said lever and said supporting arm comprising two sections having a slidable, articulating, pin-and-slot connection, a spring held dog pivoted on one of said sections and engaging the other section to hold the same in position but permitting the deflection of said link sections, substantially as described.

32. In cultivators, the combination with the frame and shovel beam hung thereon, of a pivotally mounted notched sector arm, a pivoted supporting arm having a dog for adjustably connecting it to said sector arm, a connection between said supporting arm and the shovel beam, a shift lever for raising and lowering said shovel beam, a link connection between said shift lever and said sector arm comprising two sections having a slidable, articulating pin-and-slot connection, a spring held dog pivoted to one of said link sections and engaging the other to hold the same in position, but permitting the deflection of said link sections, whereby said shovel beam may be depressed below its normal working position without disturbing said shift lever, substantially as described.

33. In cultivators, the combination with the frame and shovel beams hung thereon, of an arched axle having depended wheel sections pivoted to the frame, a pair of pivotally mounted notched sector arms, pivoted supporting arms having dogs for adjustably engaging said sector arms, connections between said supporting arms and said shovel beams, a balancing shift lever for shifting the frame and simultaneously raising and lowering said shovel beams, connecting links between said shift lever and said depending wheel sections, links connecting said shift lever and said sector arms and each comprising two sections having a slidable, articulating pin-and-slot connection and spring devices for holding said link sections in position but permitting the deflection of the same, whereby said shovel beams may be depressed below their normal position without disturbing the adjustment of said shift lever and of said supporting arms, substantially as described.

34. In cultivators, the combination with the frame and shovel beams hung thereon, of an arched wheel axle having depending wheel sections pivoted to the frame, a pair of pivotally mounted, notched sector arms, a pair of supporting arms having dogs for adjustably connecting the same to said sector arms, connections between said supporting arms and said shovel beams, a balancing shift lever for raising and lowering said shovel beams and for simultaneously shifting said frame, and said wheel sections, and links connecting said shift lever and said sector arms, each of said links comprising two sections having a slidable, articulating, pin-and-slot connection, a spring-held dog pivoted to a projection on one of said link sections and engaging the other section for holding the same in position but permitting the deflection of said sections, whereby said shovel beam may be depressed below normal working position without disturbing the adjustment of said shift lever or of said supporting arms, substantially as described.

35. In cultivators, the combination with the frame and with the shovel beams hung thereon, of an arched axle comprising a central tubular section secured to the side bars of the frame and depending wheel sections journaled in said horizontal section, a pair of notched sector arms journaled on said horizontal section, a pair of supporting arms pivoted on said horizontal section and having dogs adjustably engaging said sector arms, connections between said supporting arms and said shovel beams, a rock-shaft journaled in the front of the machine frame, a pair of rock arms on said shaft connected by links to said depending wheel sections, a second pair of rock arms on said shaft and links connecting said arms to said sector arms, said links each comprising two sections having a slidable, articulating pin-and-slot connection, and a spring-held dog pivoted to a projection on one of said sections and engaging the other section to hold the same in position but permitting the deflection of the same when said shovel beams are depressed below their normal working position, substantially as described.

36. In cultivators, the combination with the frame and shovel beam hung therefrom, of an arched axle having depending wheel sections pivoted to the frame, a pivotally mounted notched sector arm, a pivoted supporting arm connected to the shovel beam and adjustably connected to said sector arm, a balancing shift lever connected to said depending wheel sections, a link connecting said lever and said notched sector arm, said link having a stop for said sector arm and a spring extending between said arm and said link for holding said arm into engagement with said stop, substantially as described.

37. In cultivators, the combination with the frame and shovel beam hung therefrom, of an arched axle having depending wheel sections pivoted to the frame, a pivotally mounted notched sector arm, a pivoted supporting arm connected to said shovel beam and having a dog adjustably connecting said arm to said sector arm, a balancing shift lever, connections between said shift lever and said depending wheel sections, a link connecting said lever and said sector arm and comprising two sections having a sliding, pivoted connection, a dog pivoted to one of said sections and engaging the other section, a stop on one of said link sections for said sector arm and a spring extending between said sector arm and said dog for holding said dog in position and said section arm against said stop, substantially as described.

38. In cultivators, the combination with the frame and shovel beams hung thereon, of an arched axle having depending wheel sections pivoted to the frame, a pair of pivoted sector arms, a pair of pivoted supporting arms having means adjustably engaging said sector arms, suspension links connecting said supporting arms and said shovel beams, a balancing shift lever connected to said wheel sections and having lost motion connections with said sector arms, and springs for holding said sector arms in position when disengaged from said supporting arms, substantially as described.

39. In cultivators, the combination with the machine frame and shovel beams hung therefrom, of an arched supporting axle comprising a central tubular section secured to the side bars of the frame and depending wheel sections journaled in said horizontal section, a pair of sector arms pivoted on said horizontal section, a pair of supporting arms also pivoted thereon, and having means adjustably engaging said sector arms, suspension links connecting said supporting arms and said shovel beams, a rock-shaft journaled at the front of the machine frame, links connecting said rock-shaft and said depending wheel sections, lost motion link connections between said shaft and said sector arms and means for yieldingly supporting said shovel beams and for positioning said sector arms when disengaged from said supporting arms, substantially as described.

40. In cultivators, the combination with the machine frame, of a shovel beam hung at its forward end to said frame, an arched wheel axle pivoted to said frame, a pivotally mounted notched sector arm, an upwardly and rearwardly pivoted supporting arm having a dog for adjustably locking it to said sector arm, a suspension rod extending downwardly from the upper end of said supporting arm in rear of said wheel axle and connected to the rear end of said shovel beam, a rock shaft journaled at the fore part of the machine, a shift lever connected to said rock shaft, arms on said rock shaft and links connecting said arms to the depending wheel sections of said arched axle and to said notched sector arm, substantially as described.

41. In cultivators, the combination with the machine frame and the shovel beams hung thereon, of an arched wheel axle pivoted to the frame, pivotally mounted notched sector arms, pivotally mounted supporting arms having dogs for adjustably locking said supporting arms to said sector arms, connections between said supporting arms and said shovel beams, lift springs connected to said supporting arms and to the machine frame, a rock shaft journaled at the fore part of the machine frame, a shift lever connected to said rock shaft, rock arms on said shaft, and links connecting said rock arms to the depending wheel sections of said arched axle and to said notched sector arms, substantially as described.

42. In common cultivators, the combination with the machine frame, of shovel beams or gangs hung at their forward ends to the machine frame, an arched wheel axle comprising a tubular horizontal position secured at its ends to the side-bars of the machine frame and depending wheel sections journaled and laterally adjustable in said tubular horizontal section, a pair of notched sector arms pivotally mounted upon the tubular horizontal portion of said arched axle, a pair of supporting arms also pivotally mounted thereon, dogs on said supporting arms for adjustably locking the same to said sector arms, said sector arms projecting upwardly and rearwardly, suspension rods extending downwardly from the upper ends of said supporting arms and rearwardly of said wheel axle and connected to the rear ends of said shovel beams, lift springs connected to said supporting arms and extending forwardly therefrom to points of attachment on the machine frame, a rock shaft journaled at the forward end of the machine frame, rock arms on said shaft connected by links to the depending wheel sections of said arched axle, and rock arms on said rock shaft connected by links to said notched sector arms, substantially as described.

43. In cultivators, the combination with the machine frame, of an arched axle having pivoted and laterally adjustable wheel sections, a pair of shovel beams or gangs hung at their forward ends to the machine frame, a pair of pivotally mounted sector arms, a pair of pivotally mounted supporting arms having dogs for adjustably locking the same to said notched sector arms, said supporting arms projecting upwardly and rearwardly, suspension links extending downwardly from the upper ends of said supporting arms and rearwardly of said wheel axle and connected to the rear ends of said shovel beams, lift springs connected to said supporting arms and extending forwardly to points of attachment on the machine frame, a rock shaft journaled at the fore part of the machine frame, rock arms on said shaft, and links connecting said rock arms to the depending wheel sections of said arched axle and to said notched sector arms, substantially as described.

44. In cultivators, the combination with the machine frame and the arched wheel axle having pivotally mounted depending wheel sections, of a pair of shovel beams or gangs hung at their forward ends to the machine frame, of a pair of pivotally mounted, notched sector arms, a pair of pivotally mounted supporting arms having dogs for adjustably locking the same to said notched sector arms, said supporting arms extending upwardly and rearwardly, suspension links extending downwardly from the upper ends of said supporting arms and rearwardly of said wheel axle, and connected to the rear ends of said shovel beams, lift springs connected to said supporting arms and extending forwardly to points of attachment on the machine frame, a rock shaft journaled at the forward end of the machine frame, a shift lever connected to said rock shaft, connections between said rock shaft and said notched sector arm, depending rock arms on said shaft, and adjustable link connections between said rock arms and the depending wheel sections of said arched axle, substantially as described.

45. In cultivators, the combination with the machine frame and the shovel beams hung therefrom, of an arched wheel axle comprising a central tubular section secured at its ends to the side-bars of the machine frame, and a pair of depending wheel sections journaled in said central tubular section, a pair of notched sector arms journaled directly upon said central tubular section, a pair of pivotally mounted supporting arms having dogs for adjustably locking the same to said notched sector arms, connections between said supporting arms and said shovel beams, a rock shaft journaled on the machine frame, a shift lever operatively connected to said rock shaft, connections between said rock shaft and the depending wheel sections of said arched axle, a pair of rock arms on said shaft, and independent lost motion link connections between said rock arms and said notched sector arms, substantially as described.

46. In cultivators, the combination with the machine frame and the shovel beams hung thereon, of an arched wheel axle comprising a horizontal section secured to the side bars of the machine frame and depending wheel sections journaled to said horizontal section, a pair of pivotally mounted notched sector arms, shift mechanism connected to said notched sector arms and to said depending wheel sections, pivotally mounted supporting arms extending upwardly and rearwardly and having dogs for adjustably locking the same to said notched sector arms, suspension links extending downwardly from the upper ends of said supporting arms and rearwardly of said wheel axle and connected to the rear ends of said shovel beams, and inclined brace bars extending between the side-bars of the frame and the central horizontal section of said arched axle and with which said inclined brace bars said suspension links are adapted to engage in the raised position of said shovel beams, substantially as described.

47. In cultivators, the combination with the machine and the shovel beam hung thereon, of a swinging supporting arm on the machine frame connected to said shovel beam, a stop device for limiting the movement of said arm and for holding the same and said shovel beam in working position, said arm being adjustable independently of said stop device to vary the working position of said shovel beam, a lift spring connected at one end to said arm adjacent the pivot thereof and at its other end to the machine frame, and means for deflecting said lift spring away from a dead center position as said arm is adjusted to lower the working position of said shovel beam, substantially as described.

48. In cultivators, the combination with the machine frame and the shovel beam hung thereon, of a pivotally mounted sector arm, a pivotally mounted supporting arm connected to said shovel beam and adjustably connected to said sector arm, a stop device for limiting the shift of said sector arm and for holding said supporting arm and shovel beam in working position, a lift spring connected at one end to said supporting arm adjacent its pivot and at the other end to the machine frame and means for deflecting said lift spring away from a dead center position as said supporting arm is adjusted on said sector arm to vary the working position of said shovel beam, substantially as described.

49. In cultivators, the combination with the machine frame and the shovel beam hung thereon, of a swinging sector arm, a swinging supporting arm connected to said sector arm and to said shovel beam, a stop device for limiting the movement of said sector arm and for holding said supporting arm and said shovel beam in working position, said supporting arm being adjustably connected to said sector arm to vary the working position of said shovel beam, and a lift spring connected to said supporting arm and to the main frame, said stop device being yielding to permit the temporary depression of said shovel beams below their normal, working position, substantially as described.

50. In cultivators, the combination with the frame and the shovel beam hung thereon, of a pivoted supporting arm connected to said shovel beam, a shift lever for raising and lowering said shovel beam, link devices interposed between said lever and said arm and acting as a rigid connection when said lever is shifted to raise said shovel beam, said link devices being deflectable or yielding when pressure is exerted upon said shovel beam to permit the depression of the latter below normal working position, substantially as described.

51. In cultivators, the combination with the frame and the shovel beam hung thereon, of an arched wheel axle having depending wheel sections pivoted to the frame, a pivoted sector arm, a pivoted supporting arm having means for adjustably engaging said sector arm, a connection between said supporting arm and said shovel beam, a balancing shift lever connected to said wheel sections and having a lost motion connection with said sector arm, and a spring for holding said sector arm in position when disengaged from said supporting arm, substantially as described.

52. In a cultivator, the combination with the frame and the shovel beam hung therefrom, of an arched axle having depending wheel sections pivoted to the frame, a pivotally mounted sector arm, a supporting arm having a dog for adjustably locking the same upon said sector arm, connection between said supporting arm and said shovel beam, a balancing shift lever connected to said depending wheel sections, a lost motion link connection between said shift lever and said sector arm, whereby the frame is shifted forwardly by said shift lever before the shovel beam is started from working position, and a yielding stop device for limiting the movement of said sector arm when said shovel beam is lowered to working position, substantially as described.

53. In cultivators, the combination with the frame and the shovel beam hung thereon, of an arched wheel axle having depending wheel sections pivoted to the frame, a pivotally mounted supporting arm connected to said shovel beam, a balancing shift lever connected to the depending wheel sections of said arched axle, lost motion link connections between said shift lever and said supporting arm and a yielding stop device for limiting the movement of said supporting arm as said shovel beam is lowered to working position, said stop device being arranged to yield to permit the depression of said shovel beam below normal working position, substantially as described.

54. In cultivators, the combination with the frame and the shovel beam hung thereon, of an arched wheel axle having depending wheel sections swiveled to the frame, a pivoted supporting arm connected to said shovel beam, a balancing shift lever connected to said wheel sections, and a lost motion link connection between said shift lever and said supporting arm having a stop for limiting the movement of said supporting arm as said shovel beam is lowered to working position, substantially as described.

55. In cultivators, the combination with the frame and the shovel beam hung thereon, of an arched wheel axle having depending wheel sections pivoted to said frame, a pivotally mounted, notched sector arm, a pivotally mounted supporting arm connected to said shovel beam and having a dog for adjustably locking the same to said sector arm, a balancing shift lever connected to said depending wheel sections, and a lost motion link connection between said shift lever and said sector arm having a stop for limiting the movement of said sector arm as said shovel beam is lowered to working position, substantially as described.

56. In cultivators, the combination with the frame and the shovel beam hung thereon, of an arched wheel axle having depending wheel sections pivoted to the frame, a pivoted supporting arm connected to said shovel beam, a balancing shift lever connected to said wheel sections, and a link between said shift lever and said supporting arm formed of connected sections, one of said sections having a stop to limit the movement of said supporting arm as said shovel beam is lowered, said link sections forming a rigid connection to transmit motion from said shift lever to said supporting arm but yielding, when pressure is applied to said shovel beam, to permit the depression of the latter below normal working position, substantially as described.

57. In cultivators, the combination with the frame and the shovel beam hung thereon, of an arched wheel axle having depending wheel sections pivoted to the frame, a pivotally mounted, notched sector arm, a pivotally mounted supporting arm having a dog for adjustably locking the same to said notched sector arm, a balancing shift lever connected to said depending wheel sections, having a rigid connection to transmit motion from said shift lever to said sector arm but yielding when pressure is applied to said shovel beam to permit the movement of the latter below its normal working position, substantially as described.

58. In cultivators, the combination with the frame and the shovel beam hung thereon, of an arched wheel axle having depending wheel sections pivoted to said frame, a pivoted supporting arm connected to said shovel beam, a balancing shift lever connected to said wheel sections, a lost motion link connection comprising yieldingly connected sections between said shift lever and said supporting arm, and a stop on one of said link sections to limit the movement of said supporting arm as said shovel beam is lowered, said link sections forming a rigid connection to transmit motion from said balancing shift lever to said supporting arm but yielding, when pressure is applied to said shovel beam, to permit the depression of the latter below normal working position, substantially as described.

59. In cultivators, the combination with the frame and the shovel beam hung thereon, of an arched wheel axle having depending wheel sections pivoted to the frame, a pivotally mounted notched sector arm, a pivotally mounted supporting arm having a dog for adjustably locking the same to said notched sector arm, a connection between said supporting arm and said shovel beam, a balancing shift lever connected to said depending wheel sections, and a lost motion link connection between said balancing shift lever and said notched sector arm, said link connection comprising yieldingly connected sections and one of said link sections having a stop for limiting the movement of said sector arm as said shovel beam is lowered to working position, substantially as described.

60. In cultivators, the combination with the frame and the shovel beams hung thereon, of an arched wheel axle comprising a central, tubular section secured at its ends to the side-bars of the machine frame, and depending wheel sections journaled in said central tubular section, a pair of notched sector arms journaled upon said central tubular section and having link portions depending below the same, a pair of supporting arms also swiveled upon said central tubular section and having dogs for adjustably locking the same to said notched sector arms, suspension rods connecting said supporting arms and said shovel beams, a rock shaft journaled at the front part of the machine frame, a balancing shift lever connected to said rock shaft, two pairs of rock arms on said shaft, and links connecting said pairs of rock arms respectively with the depending portions of said notched sector arms and with said depending wheel sections, substantially as described.

EDWARD M. HEYLMAN.

Witnesses:
F. H. FARNSWORTH,
FRANCES SCHLEGEL.